United States Patent [19]

Forney, Jr. et al.

[11] E Patent Number: Re. 33,056

[45] Reissued Date of Patent: Sep. 12, 1989

[54] SIGNAL STRUCTURES FOR DOUBLE SIDE BAND-QUADRATURE CARRIER MODULATION

[75] Inventors: George D. Forney, Jr.; Robert G. Gallager, both of Cambridge, Mass.

[73] Assignee: Codex Corporation, Mansfield, Mass.

[21] Appl. No.: 621,127

[22] Filed: Jun. 15, 1984

Related U.S. Patent Documents

Reissue of:

[64] Patent No.: 3887768
Issued: Jun. 3, 1975
Appl. No.: 180,289
Filed: Sep. 14, 1971

U.S. Applications:

[63] Continuation of Ser. No. 144,533, Apr. 28, 1980, abandoned.

[51] Int. Cl.[4] ..... H04L 27/20

[52] U.S. Cl. ..... 375/39; 332/103; 375/42; 375/54; 375/56; 375/67

[58] Field of Search ..... 375/37, 38, 39, 41, 375/42, 43, 53, 54, 56, 67; 332/11 R, 17, 9 R, 9 T; 178/113; 370/11, 20, 21; 455/60; 340/347 DD

[56] References Cited

U.S. PATENT DOCUMENTS

| | | | |
|---|---|---|---|
| 3,123,670 | 3/1964 | Kaenel | 375/39 X |
| 3,614,622 | 10/1971 | Holsinger | 375/14 |
| 3,619,501 | 11/1971 | Nussbaumer | 375/53 |
| 3,619,503 | 11/1971 | Ragsdale | 375/42 |
| 3,706,945 | 12/1972 | Yanagidaira et al. | 375/42 X |
| 3,878,468 | 4/1975 | Falconer et al. | 375/14 |

OTHER PUBLICATIONS

C. R. Cahn, *IRE Transactions on Comm. Systems*, vol. CS-8, No. 1, pp. 150-155, Sep. 1960.

Hancock, J. C., Lucky, R. W., "Performance of Combined Amplitude and Phase Modulated Communications Systems", IRE Trans. on Comm. Sys., vol. CS-8, pp. 232-237, Dec. 1960.

R. W. Lucky, "Digital Phase and Amplitude Modulated Communication Systems", Doctoral Thesis, Purdue University, Aug. 1961.

C. N. Campopiano et al, *IRE Transactions on Comm. Systems*, vol. CS-10, No. 1, pp. 90-95, Mar. 1962.

R. W. Lucky et al, *IRE Transactions on Comm. Systems*, vol. CS-10, No. 2, pp. 185-192, Jun. 1962.

R. W. Lucky et al, *Principles of Data Communications*; McGraw-Hill Book Company, 1968.

N. I. Nasell, *Bell System Technical Journal*, vol. 47, No. 6, pp. 1001-1018, Jul.-Aug. 1968.

American Telephone and Telegraph Co., "Transmission Specifications for Voice Grade Private Line Data Channels", Mar. 1969.

Codex Corporation, letter to Auerbach Information, Inc., Re, Announcing New 4800 bps Modem, 2 pages, 14 Sep. 1970.

A. Lubarsky, Jr., Proceedings of the National Electronics Conference, vol. XXVI, pp. 942-945, Dec. 1970.

J. Salz, Bell System Technical Journal, vol. 50, No. 7, pp. 2399-2419, Sep. 1971.

C. M. Thomas, "International Telemetering Conference", pp. 289-300, Oct. 10-11-12, 1972.

G. J. Foschini et al; Bell System Technical Journal, vol. 52, No. 6, pp. 927-965, Jul.-Aug. 1973.

Bell System Technical Reference, "Data Communications Using Voiceband Private Line Channels", pp. 1-51 & A1-A16, Oct. 1973.

CCITT; Special Study Group A-Contribution No. 92, "DSB Modulation as a Preferred Technique . . . ", pp. 1-28, Aug. 1974.

Codex Corporation, Statement on Patents and Patent Licensing, Contribution No. 221, CCITT Special Study Group A, Dec. 1975.

CCITT Sixth Plenary Assembly, "9600 Bits per Second Modem Standardized for Use on Leased Telephone-Type Circuits", Orange Book, vol. VIII.1, pp. 143-153, Sep.-Oct. 1977.

*Primary Examiner*—Benedict V. Safourek

[57] ABSTRACT

Double side band-quadrature carrier modulation signal points as mapped on the complex plane are drawn from an alphabet consisting of at least 8 points, and are set up in concentric rings each rotated by 45° with respect to adjacent rings. Differential encoding is shown encoding the phase components of the transmitted signals.

9 Claims, 4 Drawing Sheets

4-ϕ PSK

8-ϕ PSK

16-ϕ PSK

4-LEVEL Q AM

16-LEVEL Q AM

4-ϕ, 2-AMPLITUDE

4-ϕ, 4-AMPLITUDE

8-ϕ, 2-AMPLITUDE

B1 B3
B1 B2 B3
B1 B2 B3
B1 B2 B3
B1 B2 B3
B1 B2
XS
X1
X2
YS
Y1
Y2
B3 B4
B1 B2 B4
B1 B2 B4
B1 B2 B3 B4
B1 B3 B4
B1 B2 B4
B2 B3 B4
B2 B3 B4
XS
X1
X2
B3 B4
B1 B2 B3
B1 B2 B3
B1 B2 B3 B4
B1 B3 B4
B1 B2 B3
B2 B3 B4
B2 B3 B4
YS
Y1
Y2

B1 B2
B3 B4
X3
Y3

SIGNAL STRUCTURES FOR DOUBLE SIDE BAND-QUADRATURE CARRIER MODULATION

Matter enclosed in heavy brackets [ ] appears in the original patent but forms no part of this reissue specification; matter printed in italics indicates the additions made by reissue.

This application is a continuation of application Ser. No. 144,533, filed Apr. 28, 1980, now abandoned.

This invention relates to double side band-quadrature carrier (DSB-QC) modulation. DSB-QC modulation subsumes a class of modulation techniques such as phase-shift-keying (PSK), quadrature amplitude modulation (QAM), and combined amplitude and phase modulation, such as have long been known in the art.

In high-speed data transmission across narrow-bandwidth channels such as the typical voice grade telephone channel, DSB-QC modulation has certain inherent advantages over single-sideband (SSB) and vestigial-sideband (VSB) techniques, such as are used in the majority of high-speed modems today. Against gaussian noise, it is inherently as efficient as SSB or VSB techniques in terms of the signal-to-noise ratios required to support a certain speed of transmission at a certain error rate in a given bandwidth. In addition, a coherent local demodulation carrier can be derived directly from the received data, without requiring transmission of a carrier or pilot tone. Furthermore, DSB-QC systems can be designed to have a much greater insensitivity to phase jitter on the line, or to phase error in the recovered carrier, than is possible with SSB or VSB signals.

For modest data rates, well-known modulation schemes such as four-phase modulation provide good margins against both gaussian noise and phase jitter. At higher data rates, more bits of information must be sent per signalling interval, so multi-level signalling structures of greater complexity must be used. The standard schemes mentioned above begin to degrade rapidly aginst either gaussian noise or phase jitter when more signal points are required. It is the principal purpose of the present invention to provide novel signal structures which continue to exhibit near-optimum margins against both gaussian noise and phase jitter as additional points are added. Further advantages of the invention are simplicity of implementation and of detection, suppression of carrier, and 90° symmetry, which allows use of differential phase techniques.

In general the invention features a double side band-quadrature carrier modulation system in which the signal points, as mapped on the complex plane, are drawn from an alphabet consisting of at least 8 points, and are set up in concentric rings each rotated by 45° with respect to adjacent rings. Preferred embodiments employ differential encoding of the phase components of the transmitted signals.

Other advantages and features of the invention will be apparent from the following description of a preferred embodiment thereof, taken together with the drawings, in which:

FIG. 1 is a block diagram of a DSB-QC modulation system;

FIGS. 2a–h show several prior art signal structures mapped on the complex plane;

FIGS. 3a, b show signal structures of the invention mapped on the complex plane;

FIGS. 4a, b are logic diagrams for implementation of the structures of FIGS. 3a, b;

In DSB-QC modulation the transmitted spectrum X(w) is symmetric about some center (carrier) frequency $w_c$. In digital DSB-QC, data samples $d_k$ arrive at rates of 1/T samples/second, and take on one of M values represented by a set of complex numbers $S_i$, $1 \leqq i \leqq M$. Commonly $M=2^n$, and n bits can be transmitted per sample, or n/T per second. The transmitted signal x(t) can be represented by $$\begin{aligned} x(t) &= \mathrm{Re} \sum_k d_{kh}(t-kT)\, e^{jw_c t} \\ &= \sum_k (\mathrm{Re}\, d_k) h(t-kT)\cos(w_c t) - \sum_k (\mathrm{Im}\, d_k \\ &\quad h(t-kT)\sin(w_c t) \end{aligned}$$

where h(t) is the impulse of a low pass filter whose cutoff frequency is half the bandwidth of the channel.

Figure 1:
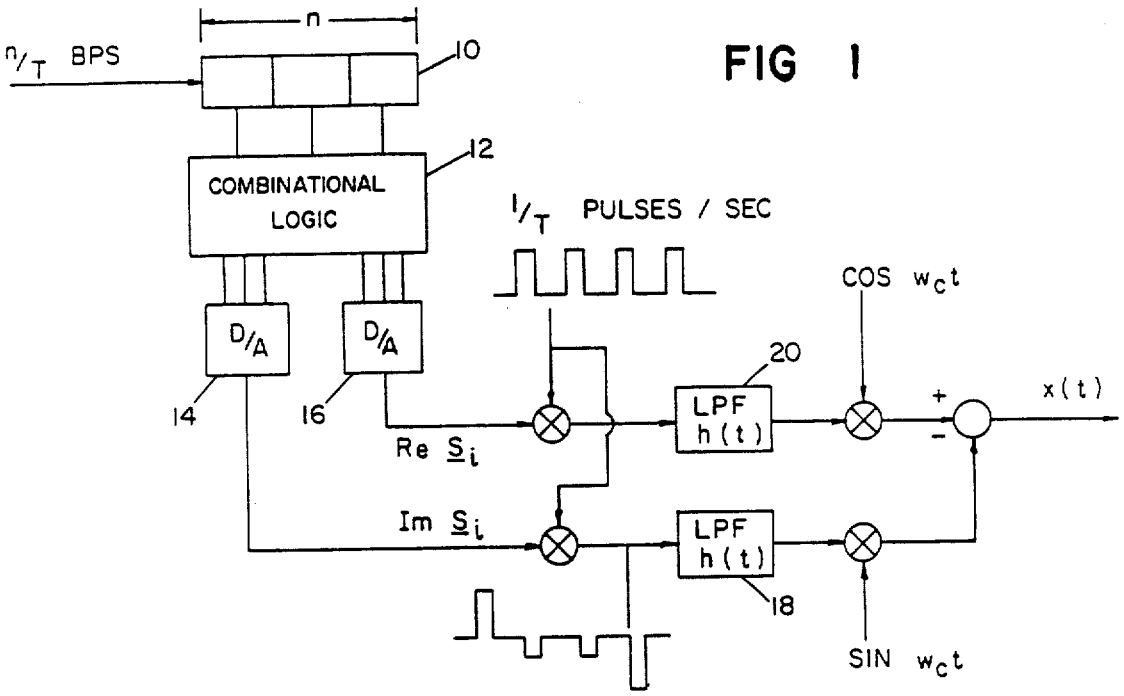

A circuit for realizing such a modulation scheme is shown in FIG. 1. A stream of input bits arrives at a rate of n/T bits per second, and is passed through an n-bit storage register 10. The n storage elements in the register are inputs to a combinational logic circuit 12 which forms one of $M=2^n$ pairs of output words; this pair of words is a digital representation of the real and imaginary parts of the $S_i$ appropriate to the n bits of input. This pair of words controls a pair of digital-to-analog converters 14, 16, whose output voltages represent Re $S_i$ and Im$S_i$. Once each T seconds this pair of D/A outputs is gated to form a pair of narrow pulses of amplitudes proportional to Re$S_i$ and Im$S_i$. Each of these pulse trains is then filtered in an identical linear filter 18, 20 characterized by the impulse response h(t). Finally, the lower filter output is multiplied by $\sin(w_c t)$ (the "quadrature" carrier) and subtracted from the product of the upper filter output and $\cos(w_c t)$ (the "in-phase" carrier). This is a baseband technique; there also exist well-known methods of operating directly on the carrier itself at passband.

Figure 2A:
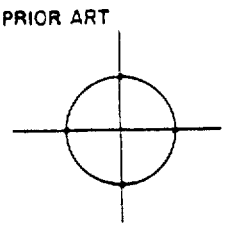
Figure 2B:
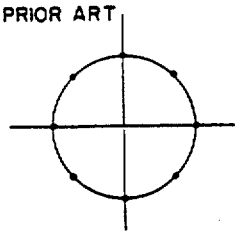
Figure 2C:
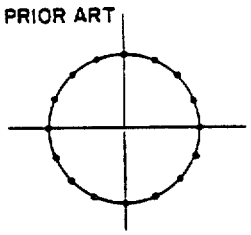
Figure 2D:
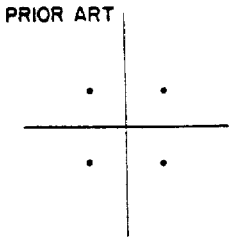
Figure 2E:
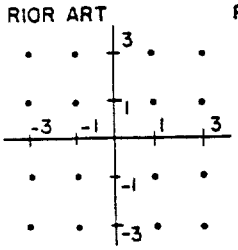

An aspect of the invention involves the realization that a signal structure can be characterized by the sets of points [$S_i$, $1 \leqq i \leqq M$] associated with the modulation scheme, which we can map pictorially on the complex plane. In PSK, for example, the M signal points are described simply by a set of points evenly spaced around a circle. FIGS. 2a, 2b, and 2c illustrate 4-, 8-, and 16-phase modulation according to this method of representation. In QAM, Re$S_i$ and Im$S_i$ may each take on independently one of m levels, typically equally-spaced, so that $M=m^2$. FIGS. 2d and 2e illustrate 4-level and 16-level QAM; it will be noted that 4-level QAM is effectively identical to 4-phase PSK in this representation, although their implementations may be quite different. Finally, in combined amplitude and phase modulation, the amplitude and phase variables are independently varied, to give for example the 4-phase and 2- or 4-amplitude structures of FIGS. 2f and 2g, or the 8-phase, 2-amplitude structure of FIG. 2h.

Figure 6:
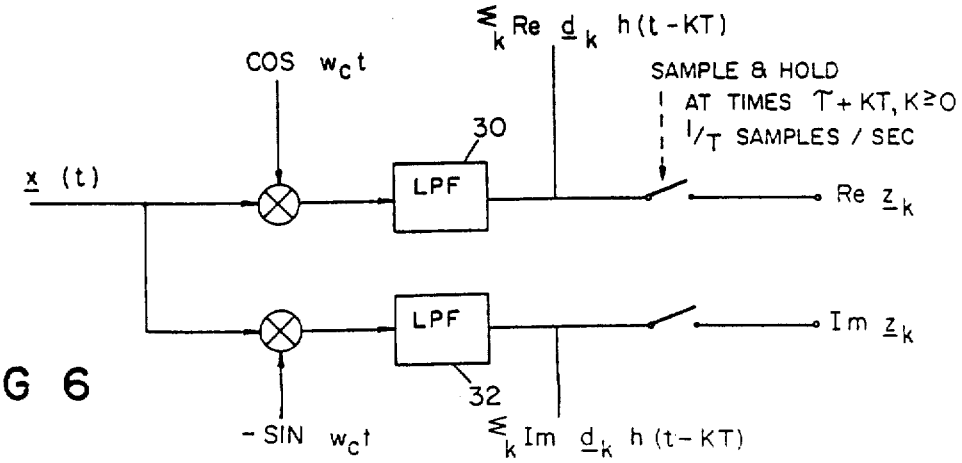
FIG. 6 is a block diagram of a receiver.

This method of representation permits examination of the effect of distrubances on the modulated waveform x(t). We first consider an ideal case, illustrated in FIG. 6. x(t) enters the receiver and is demodulated by the two locally-generated carriers $\cos(w_c t)$ and $-\sin(w_c t)$. The double-frequency terms at 2 $w_c$ are removed by low-pass filters 30, 32 to recover the low pass in-phase and quadrature waveforms $$\Sigma \mathrm{Re} d_k\, h(t-kT)$$

and $$\Sigma \mathrm{Im} d_k h(t-kT).$$

Now suppose that h(t) is a perfect Nyquist waveform, i.e., for some time, $\tau$, $h(\tau)=1$, but $h(\tau-kT)=0$ for integers $k>0$ or $k<0$. Then if we sample the two channels every T seconds at the correct times $\tau+kT$, there will be no intersymbol interference, and we simply recover the pair of voltages $\mathrm{Re}z_k=\mathrm{Re}d_k$ and $\mathrm{Im}z_k=\mathrm{Im}d_k$, which tell us which bits were sent.

In a real situation, h(t) will not be a perfect Nyquist waveform, and the channel will introduce additional linear distortion which will lead to intersymbol interference. (At high data rates, it is usually necessary to incorporate an adaptive equalizer to reduce intersymbol interference to an acceptable level such as is described in Proakis and Miller, IEEE Trans. Inf. Theo. Vol. IT-15, No. 4, 1969.)

Besides intersymbol interference (which also results when the outputs are not sampled at exactly the right times), real channels introduce other degradations such as noise and nonlinearities. All of these effects tend to perturb the received pair of samples $\mathrm{Re}z_k$ and $\mathrm{Im}z_k$ in a random direction in the complex plane. That is, if we define the complex error $e_k$ by $$e_k=z_k-d_k,$$

then $e_k$ is equally likely to be a vector of any phase. Against such disturbances, therefore, we realize it to be desirable to maximize the Euclidean distance between signal points, subject to a contraint in the total signal energy E, defined as $$E=\frac{1}{M}\sum_{i=1}^{M}|S_i|^2.$$

We define the required signal-to-noise margin S as 10 $\log_{10}E$ dB, where E is calculated for the signal points $S_i$ scaled so that the minimum Euclidean distance between any two points is 2 (so that an error can occur only if $|e_k|\geqq 1$).

Another disturbance of importance on telephone lines is phase jitter. If a transmitted waveform x(t) is subject to phase jitter, the result is (to first order when the phase jitter is slow and channel filtering unimportant)

$$x'(t)=\mathrm{Re}\Sigma_k d_k h(t-kT)\, e^{j(w_c t+\theta(t))},$$

where $\theta(t)$ is a random phase process. Typically on telephone lines $\theta(t)$ contains frequencies up to 180 Hz, and may have amplitude up to 30° peak-to-peak or more. To some extent the phase jitter can be tracked at the receiver to give the locally-generated carriers $\cos(w_c t+\theta(t))$ and $\sin(w_c t+\theta(t))$, but there will always remain some residual phase error $\theta_e(t)=\theta'(t)-\theta(t)$. The effect of such a phase error is to rotate the received vector in the complex plane by the phase angle $\theta_{ek}=-\theta_e(\tau+kT)$, so that the received complex value is $$z_k'=e^{j\theta_{ek}}z_k,$$

where $z_k$ is the value which would have been received had there been no phase error. It is therefore especially important that signal points be well-separated in phase.

Table 1 below gives required signal-to-noise ratios and minimum phase separations of points of the same amplitude for the signal structures of FIGS. 2a–h. (The minimum phase separation criterion above is an oversimplified, but still qualitatively indicative, measure of phase jitter immunity, since errors will actually be caused by the combined effects of noise and phase jitter.)

TABLE I

| | 2a | 2b | 2c | 2d | 2e | 2f | 2g | 2h |
|---|---|---|---|---|---|---|---|---|
| Required Signal-to-Noise Ratio (dB) | 3 | 8.3 | 14.1 | 3 | 10 | 8.4 | 13.9 | 11.5 |
| Phase Separation | 90° | 45° | 22.5° | 90° | 37° | 90° | 90° | 45° |

Experience has shown that on telephone lines a minimum phase separation of 45° may be insufficient to guarantee low error rates when phase jitter is severe. For M=8 or 16, this means that only the 4-phase, 2- or 4-amplitude structures of FIGS. 2f and 2g can be used. But these structures are rather inefficient in their use of power, as is shown by their values of required signal-to-noise margin in Table I.

Figure 2F:
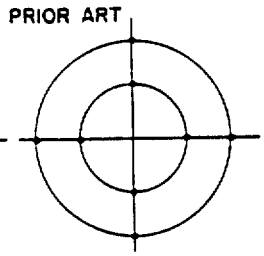
Figure 2G:
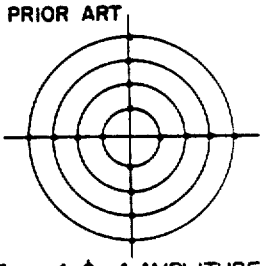
Figure 2H:
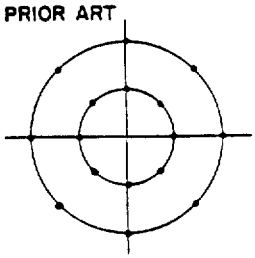
Figure 3A:
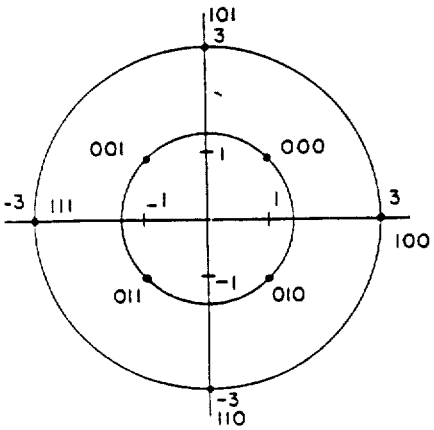

The signal structures of the present invention retain the full 90° phase separations of the 4-phase structures, as well as their four-phase symmetry, while substantially reducing the required signal-to-noise margin over the structures of FIGS. 2f and 2g. FIG. 3a illustrates a structure according to the invention for the case M=8, and FIG. 3b, a structure for M=16. In the former case the points are at $(1+j)j^k$ and $3j^k$ for k=0, 1, 2, 3; in the latter case they are at these eight points plus the points $3(1+j)j^k$ and $5j^k$, k=0, 1, 2, 3. FIG. 3a resembles the 4-phase, 2-amplitude structure of FIG. 2f, except that the two rings have been rotated 45° with respect to one another, which allows the outer radius to be decreased without loss of signal-to-noise margin. (Actually the outer ring could be pulled in slightly more, but use of integer-valued coordinates simplifies implementation.) Similarly, FIG. 3b resembles FIG. 2b, except that the second ring is rotated 45° with respect to the first, the third 45° with respect to the second, and the fourth 45° with respect to the third, allowing decreases in the radii of all outer rings without loss of signal-to-noise margin.

Figure 3B:
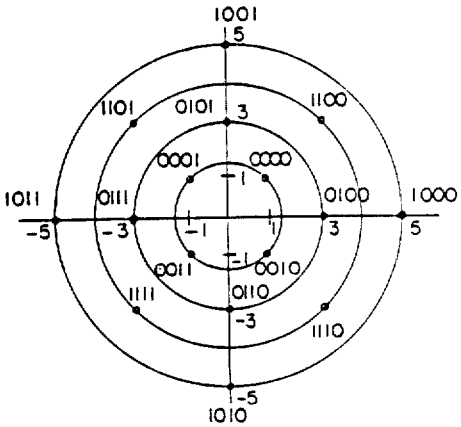

Table II below gives required signal-to-noise ratios and minimum phase separations for the structure of FIGS. 3a and 3b. The savings over FIGS. 2f and 2g are 1 dB and 2.6 dB, respectively. In fact FIG. 3b is only 1.3 dB worse than the optimal FIG. 2e for M=16, but has greatly enhanced protection against phase errors.

TABLE II

| | 3a | 3b |
|---|---|---|
| Required Signal-to Noise Ratio (dB) | 7.4 | 11.3 |
| Phase Separation | 90° | 90° |

In general, the class of structures according to the invention may be described as follows. Interest is confined to M-point structures for $M\geqq 8$, since the simple 4-phase structure of FIG. 2a is entirely satisfactory for M=4. M is assumed to be a multiple of 4, as it will be if it is a power of 2. Then, m=M/4 rings of radii $r_1, r_2, \ldots r_m$ are set up, with four points on each ring, and with each succeeding ring rotated 45° with respect to the previous one. The set $\{S_i\}$ may be described generally by the complex numbers $ar_iu_ij^k$ where $1 \leqq i \leqq m$, $0 \leqq k \leqq 3$, $u_i = 1$ for i even and $1+j/\sqrt{2}$, for i odd, and a is an arbitrary complex constant. In some of the outer rings it may be acceptable to use 8-phase structures; this possibility is accounted for by the requirement $r_1 < r_2 \leqq r_3 \leqq r_4 \ldots \leqq r_m$; thus only the innermost ring necessarily contains four points.

Figures 4A, 4B:
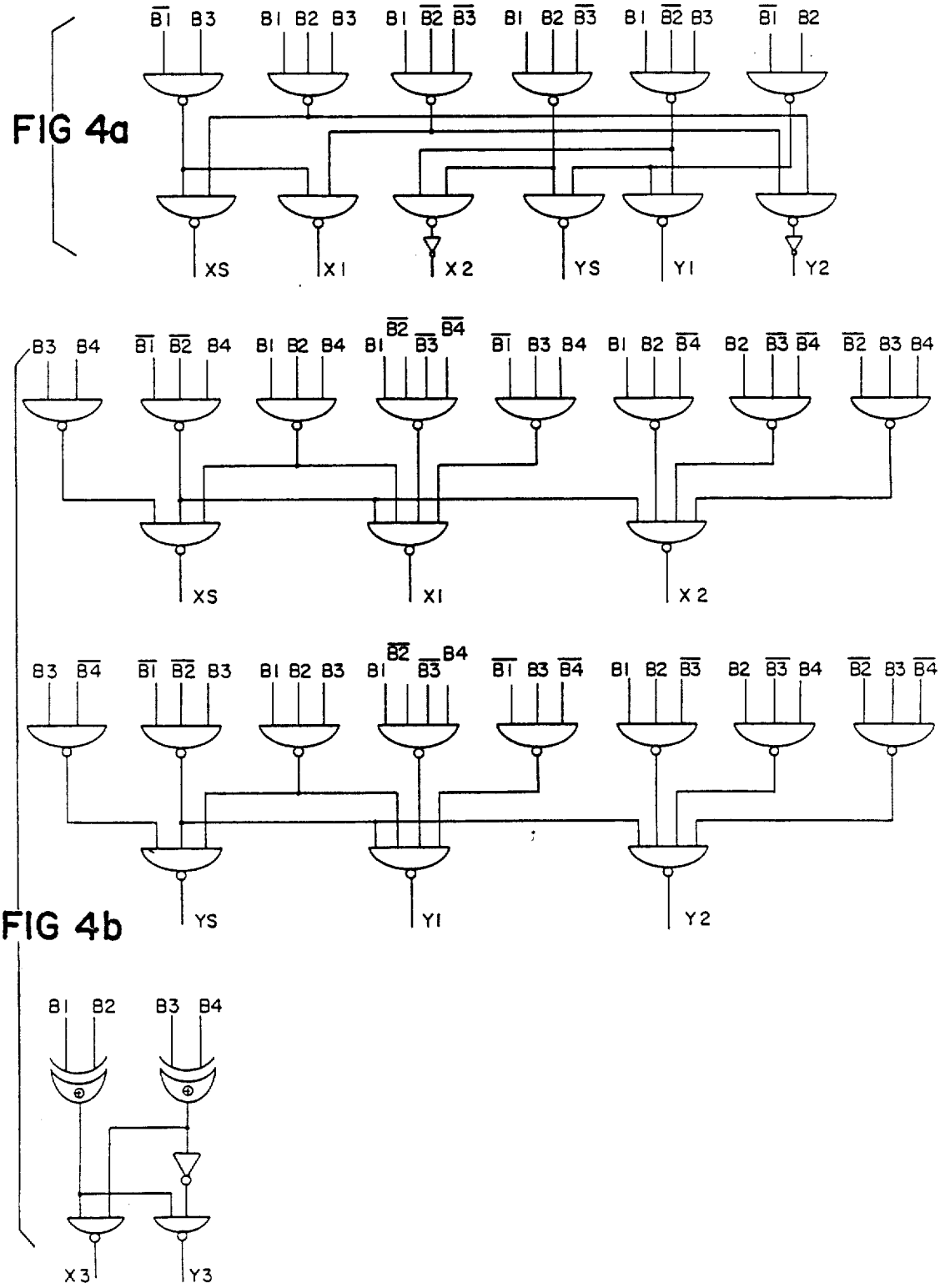

Implementation of the invention is straight-forward. The circuit of FIG. 1 can be used with appropriate combinational logic to generate the integers 0, +1, +3, or +5 in ordinary two's-complement form, which can then drive standard 3- or 4-bit D/A converters. FIG. 4a gives appropriate logic for the signal structure of FIG. 3a, where (B1, B2, B3) are the three input bits, (XS, X1, X2) and (YS, Y1, Y2) are two's-complement representations of the real and imaginary parts of the signal points, and the correspondence is according to the three-bit numbers associated with each signal point on the diagram of FIG. 3a. (In this correspondence B1 is in effect an amplitude variable denoting inner or outer ring, whereas B2 and B3 select one of the four phases.) Similarly FIG. 4b gives logic for FIG. 3b, where (B1, B2, B3, B4) are the four input bits and (XS, X1, X2, X3) and (YS, Y1, Y2, Y3) are the coordinates of the signal points in two's-complement form, coded according to the diagram of FIG. 3b (where B1 and B2 select one of the four rings, and B3 and B4 select the phase on the ring).

Because of the four-phase symmetry of these structures, the carrier is suppressed—i.e., there is no carrier power at the frequency $w_c$. Nonetheless there are a number of techniques by which a carrier may be derived by the receiver from the received data signal. Such techniques generally cannot distinguish between the correct phase of the received carrier and the correct phase plus multiples of 90°, due again to the 90° symmetry of the signal structure, and so may set up in any of four phases; there is said to be a 90° phase ambiguity in the recovered carrier. It is advantageous under these conditions to differentially encode the phase of the transmitted signal, by selecting the phase of the signal transmitted at time t on the basis of the bits for time t and the phase transmitted at time t−1. For example, in the eight-point structure of FIG. 3a, the two bits B2 and B3 select the phase of the transmitted signal according to $$d_k = d(B1_k)e^{j\theta(B2_k, B3)}$$

where $d(0)=(1+j)$ and $d(1)=3$, while $\theta(0,0)=0$, $\theta(0,1)=\pi/2$, $\theta(1,1)=\pi$, and $\theta(1,0)=3\pi/2$, and $B1_k$, $B2_k$ and $B3_k$ represent the values of the three input bits at time k. If instead the phase is differentially encoded then the phase $\theta_k$ at the time k is made equal to the phase $\theta_{k-1}$ at time k−1 plus $\theta(B2_k, B3_k)$; i.e., $$\theta_k = \theta_{k-1} + \theta(B2_k, B3_k)$$

$$d_k = d(B1_k)e^{j\theta_k}$$

Then at the receiver the phase $\theta(B2_k, B3_k)$ is detected as the difference between the estimates $\theta_k$ and $\theta_{k-1}$ and is unaffected by constant 90° phase rotations. The same differential phase technique can be used with the phase bits B3 and B4 of FIG. 3b, or indeed with any of the signal structures of the invention.

Figure 5:
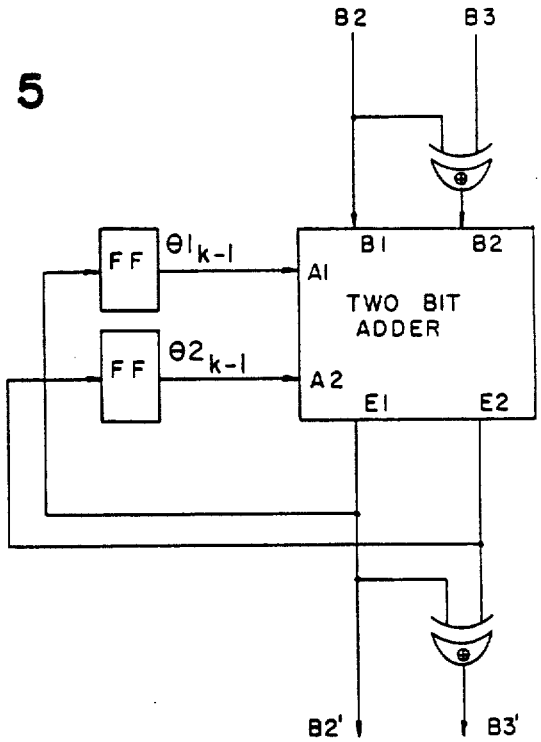
FIG. 5 is a block diagram of a differential encoder.

FIG. 5 illustrates the implementation of differential encoding. The phase bits B2 and B3 are Gray-coded into a 2-bit integer which is added to the stored 2-bit integer $(\theta 1_{k-1}, \theta 2_{k-1})$ without carry—i.e., modulo 4. The result is an integer $(\theta 1_k, \theta 2_k)$ representing the current phase, which is stored in a 2-bit memory after each sample by a clock pulse (not shown), to become the integer $(\theta 1_{k-1}, \theta 2_{k-1})$ for the next sample. The integer is also Gray-decoded to form a (B2′,B3′) which can be used instead of (B2, B3) as the input to the combinational logic of FIG. 4a. [Note that when $(\theta 1_{k-1}, \theta 2_{k-1})=(0, 0)$(B2′,B3′)=(B2, B3).]

Other embodiments are within the following claims:

We claim:

1. A double side band-quadrature carrier modulation system comprising input means for receiving a sequence of symbols $a_k$ at a rate 1/T per second.

coding means connected to said input means for providing from said symbbols a sequence of complex valued signal points $d_k$ drawn from an alphabet comprising M points arranged in a multiplicity of concentric rings in the complex plane including an innermost ring having four equally spaced points and a plurality of additional rings each having four equally spaced points, each said ring being rotated by 45° with respect to adjacent said rings, and modulating means connected to said coding means for providing from said signal points a signal in the form $$x(t) = Re \sum_k d_k\, h(t - kT)\, e^{jwct},$$

where h(t−kT) represents an impulse response, $w_c$ represents a carrier frequency, t represents time, j equals $\sqrt{-1}$, and k is the index of $d_k$ and $a_k$ *wherein said coding means includes means for effectively providing said signal points arranged in at least four concentric rings in the complex plane.*

[2. The system of claim 1 wherein said coding means includes means for effectively providing said signal points arranged in at least four concentric rings in the complex plane.]

3. The system of claim [2] *1* wherein said coding means includes means for causing the innermost four said rings to have radii in the ratio $\sqrt{2}$:3:3$\sqrt{2}$:5.

4. The system of claim 1 wherein said coding means includes means for causing the phase component of each $d_k$ to depend upon $a_k$ and upon the phase component of $d_{(k-1)}$.

5. The system of claim 1 wherein said coding means includes means for causing each said $d_k$ to have integer valued coordinates in the complex plane.

6. A double side band-quadrature carrier modulation system comprising input means for receiving a sequence of symbols $a_k$ at a rate 1/T per second, coding means connected to said input means for providing from said symbols a sequence of complex valued signal points $d_k$ drawn from an alphabet comprising M points arranged in a multiplicity of concentric rings in the complex plane including an innermost ring having four equally spaced points and [a plurality of] *at least three* additional rings having four equally spaced points, each said ring being rotated by 45° with respect to adjacent said rings, and filtering means connected to said coding means for providing from said signal points the real and imaginary parts of a complex valued baseband signal in the form $$\sum_{k} d_K\, h(t - kT),$$

and modulating means connected to said filtering means for providing from said baseband signal a passband signal in the form $$x(t) = \mathrm{Re} \sum_{r} d_K\, h(t - kT)\, e^{jw_c t},$$

where $h(t-kT)$ represents an impulse response, $w_c$ represents a carrier frequency, t represents time, j equals $\sqrt{-1}$, and k is the index of $d_k$ and $a_k$.

7. A double side band-quadrature carrier modulation method comprising receiving a sequence of symbols $a_k$ at a rate 1/T per second providing from said symbols a sequence of complex valued signal points $d_k$ drawn from an alphabet comprising M points arranged in a multiplicity of concentric rings in the complex plane including an innermost ring having four equally spaced points and [a plurality of] *at least three* additional rings each having four equally spaced points, each said ring being rotated by 45° with respect to adjacent said rings, and providing from said signal points a signal in the form $$x(t) = \mathrm{Re} \sum_{k} d_k\, h(t - kT)\, e^{jw_c t},$$

where $h(t-kT)$ represents an impulse response, $w_c$ represents a carrier frequency, t represents time, j equals $\sqrt{-1}$, and k is the index of $d_k$ and $a_k$.

8. A double side band-quadrature carrier modulation method comprising receiving a sequence of symbols $a_k$ at a rate 1/T per second, providing from said symbols a sequence of complex valued signal points $d_k$ drawn from an alphabet comprising M points arranged in a multiplicity of concentric rings in the complex plane including an innermost ring having four equally spaced points and [a plurality of] *at least three* additional rings having four equally spaced points, each said ring being rotated by 45° with respect to adjacent said rings, and providing from said signal points the real and imaginary parts of a complex valued baseband signal in the form $$\sum_{r} d_K\, h(t - kT),$$

and providing from said baseband signal a passband signal in the form $$x(t) = \mathrm{Re} \sum_{k} d_k\, h(t - kT)\, e^{jw_c t},$$

where $h(t-kT)$ represents an impulse response, $w_c$ represents a carrier frequency, t represents time, j equals $\sqrt{-1}$, and k is the index of $d_k$ and $a_k$ *wherein said coding means includes means for effectively providing said signal points arranged in at least four concentric rings in the complex plane.*

*9. The system of claim 1 wherein said coding means includes means for providing signal points from an alphabet of sixteen points arranged in exactly four concentric rings in the complex plane.*

* * * * *